United States Patent [19]

Makowski et al.

[11] 4,222,914
[45] Sep. 16, 1980

[54] PROCESS FOR FORMING A ZN SULFONATE CONTAINING ELASTOMER

[75] Inventors: Henry S. Makowski, Scotch Plains; Robert R. Klein, Berkeley Heights; Robert D. Lundberg; Jan Bock, both of Bridgewater, all of N.J.

[73] Assignee: Exxon Research & Engineering Co., Florham Park, N.J.

[21] Appl. No.: 22,951

[22] Filed: Mar. 23, 1979

Related U.S. Application Data

[63] Continuation-in-part of Ser. No. 2,022, Jan. 8, 1979, abandoned, which is a continuation of Ser. No. 855,756, Nov. 29, 1977, abandoned.

[51] Int. Cl.$^2$ ............................................. C08L 91/00
[52] U.S. Cl. ........................ 260/23.7 B; 260/23.5 A; 260/33.4 R; 260/33.4 PQ; 260/33.6 AQ; 260/33.8 UA; 260/DIG. 31
[58] Field of Search ............... 260/33.8 UA, 33.6 A, 260/33.6 AQ, 33.4 R, 33.4 PQ, 23.5 A, 23.7, DIG. 31

[56] References Cited

U.S. PATENT DOCUMENTS

| 3,642,728 | 2/1972 | Canter | 260/23.7 M |
|---|---|---|---|
| 3,836,511 | 9/1974 | O'Farrell et al. | 260/DIG. 31 |
| 3,847,854 | 11/1974 | Canter et al. | 260/23.7 M |
| 3,870,841 | 3/1975 | Makowski et al. | 260/23.7 M |
| 3,974,241 | 8/1976 | Lundberg et al. | 260/897 B |
| 4,137,203 | 1/1979 | Makowski et al. | 260/23.5 A |

Primary Examiner—Lewis T. Jacobs
Attorney, Agent, or Firm—Richard E. Nanfeldt

[57] ABSTRACT

This invention relates to a process for the formation of a neutralized sulfonated polymer having about 10 to about 60 meq. sulfonate groups, wherein the sulfonate groups are neutralized with a zinc counterion. A cement of a polymer having olefinic functional groups and a non-reactive solvent is contacted with a sulfonated agent such as an acyl sulfate. The sulfonated polymer is then neutralized with a solution of zinc acetate dissolved in a solvent system of methanol alone or methanol and water, wherein the volume percent of methanol based on non-reactive solvent is less than about 10. A carboxylic acid can be then added to the cement of the neutralized sulfonated polymer thereby forming a zinc salt of the carboxylic acid in situ, wherein the zinc salt of the carboxylic acid is a preferential plasticizer for the zinc sulfonate groups. The Brookfield viscosity at 0.6 rpm at room temperature of the cement of the zinc neutralized sulfonated polymer is less than about 50,000 cps.

12 Claims, 1 Drawing Figure

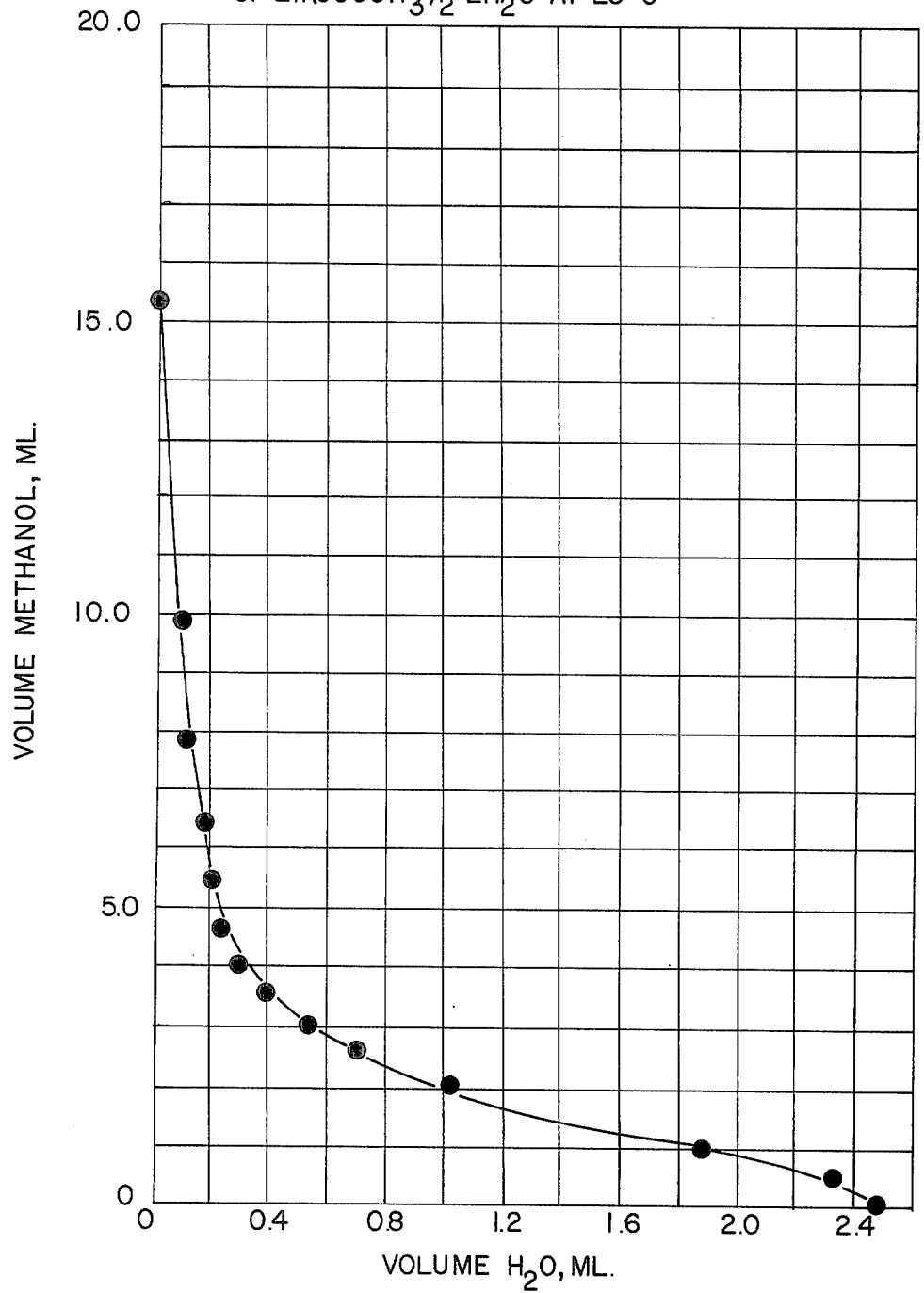

PROCESS FOR FORMING A ZN SULFONATE CONTAINING ELASTOMER

CROSS-REFERENCE TO RELATED APPLICATIONS

This application is a CIP application of U.S. Ser. No. 002,022 filed Jan. 8, 1979, now abandoned, which in turn is a Rule 60 Continuation application of U.S. Ser. No. 855,756 filed Nov. 29, 1977, now abandoned.

BACKGROUND OF THE INVENTION

1. Field of the Invention

This invention relates to a process for the formation of a neutralized sulfonated polymer having about 10 to about 50 meq. sulfonate groups, wherein the sulfonate groups are neutralized with a zinc counterion. A cement of a polymer having olefinic functional groups and a non-reactive solvent is contacted with a sulfonating agent such as an acyl sulfate. The sulfonated polymer is then neutralized with a solution of zinc acetate dissolved in a solvent system of methanol alone or methanol and water, wherein the volume percent of methanol based on non-reactive solvent is less than about 10. A carboxylic acid can be then added to the cement of the neutralized sulfonated polymer thereby forming a zinc salt of the carboxylic acid in situ, wherein the zinc salt of the carboxylic acid is a preferential plasticizer for the zinc sulfonate groups. The Brookfield viscosity at 0.6 rpm at room temperature of the cement of the zinc neutralized sulfonated polymer is less than about 50,000 cps.

2. Description of the Prior Art

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized on a two-roll mill with a basic material to form an ionically cross-linked elastomer at room temperature having substantially improved physical properties over an unsulfonated elastomer. These sulfonated elastomers, may be processed somewhat like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups, I, II, III, IV, V, VIB, VIIB and VIII and mixtures thereof of the Periodic Table of Elements.

Although this patent teaches the use of NaOH dissolved in methanol as a neutralizing agent, it fails to teach the criticality of the volume % of the methanol, the use of the zinc acetate to provide improved metal neutralized sulfonated polymers, or the ability to form a preferential plasticizer in situ.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers in solution are organic amines dissolved in an aliphatic alcohol. The resultant neutralized sulfonated elastomeric polymers prepared by this process exhibit somewhat inferior physical properties due to a rather low degree of ionic association.

U.S. Pat. Nos. 3,870,841 and 3,847,854, herein incorporated by reference, teach a method of plasticization of the polymeric backbone of a neutralized sulfonated polymer. The plasticizing agent is incorporated into the sulfonated polymer by hot melting the neutralized sulfonated polymer with the plasticizing agent. Although the rheological properties are improved, the incorporation of these plasticizing agents into the neutralized sulfonated polymers is extremely difficult and usually results in a general decrease in physical properties.

The four aforementioned patents teach the method of compounding the additives into the neutralized sulfonated elastomeric polymer under high heat and shear conditions or the use of an organic amine neutralizing agent thereby resulting in compositions either having poor rheological or physical properties.

The present invention teaches a new improved process for the formation of an improved gel-free neutralized sulfonated elastomeric polymer having both excellent rheological and physical properties. The improvement in the process comprises the neutralization of the sulfonated cement by the addition of zinc acetate dissolved in a solvent system of methanol or a mixture of methanol and water which can be followed by the subsequent addition of a carboxylic acid to form in situ a zinc salt of the carboxylic acid which acts as a preferential plasticizer for the zinc neutralized sulfonate groups.

SUMMARY OF THE INVENTION

The complete process for the production of neutralized and plasticized sulfonated low unsaturation elastomers requires, after sulfonation, the effective neutralization of the unneutralized sulfonate groups with ionic reagents to produce a cement which is gel-free and low in viscosity. It has been found that such a process can be achieved when the sulfonated cement is neutralized with a solution of zinc acetate dissolved in a solvent system of methanol or a mixture of methanol and water which is followed by the subsequent addition of a carboxylic acid thereby forming the zinc neutralized sulfonated polymer and a zinc salt of the carboxylic acid in situ, wherein the volume percent of methanol based on the volume of non-reactive solvent is less than about 10. The resultant Brookfield viscosity at room temperature at about 0.6 rpm of the cement of the neutralized sulfonated polymer is less than about 50,000 cps. The zinc neutralized sulfonated polymers derived from this process are essentially gel-free and possess excellent physical and rheological properties.

GENERAL DESCRIPTION OF THE INVENTION

The present invention relates to a unique and novel improved process for the manufacture of a gel-free neutralized sulfonated elastomeric polymer having both improved physical and rheological properties, by sulfonation of an unsaturated elastomer in a solution of a non-reactive solvent, and the neutralization of the sulfonate groups of the sulfonated elastomer in the cement by the addition of a solution of zinc acetate in a solvent system of methanol or a mixed solvent system of methanol and water, wherein the volume percent of methanol based on the volume of non-reactive solvent is less than 10 volume percent. After the neutralization of sulfonated cement has been completed, a carboxylic acid such as stearic acid can be optionally added to the cement, wherein the excess zinc acetate reacts in situ with the carboxylic acid such as stearic acid thereby forming the preferential plasticizer, zinc stearate, for the zinc neutralized sulfonate groups. This improved process allows for complete neutralization of the sulfonate groups and the formation of cements which are easily handled and pumped.

The elastomeric polymers of the present invention are derived from elastomers having olefinic unsaturation sites wherein the polymer has from about 0.1 to about 10.0 mole % olefinic unsaturation. The unsaturation sites can be in the polymer backbone, pendant therefrom or cyclic except that aromatic polymers are excluded from this description. In particular, the unsaturated polymers of this present invention include low unsaturated polymers such as Butyl rubber or EPDM polymers.

The sulfonated polymers of this invention contain less than about 5 wt. % gel, more preferably less than about 3, and most preferably less than about 1 as measured by stirring a given weight of polymer in a solvent comprised of 95 toluene/5-methanol at a concentration of 50 g/liter for 24 hours, allowing the mixture to settle, withdrawing a weighed sample of the supernatant solution and evaporating to dryness.

In the practice of this invention, the molecular weight of the elastomeric polymer and the concentration of the elastomeric polymer in the non-reactive sulfonation solvent are very important. In order to have a viable process, the neutralized sulfonated cement at the end of the process must have sufficiently low viscosity so that the cement may be properly handled with pumping operations, cleaning operations, and the like. The major factors which contribute to the viscosity of the final neutralized sulfonated cement are molecular weight of the base elastomeric polymer, the concentration of the elastomeric polymer in the non-reactive sulfonation cement, the relative amount of sulfonate groups incorporated into the elastomeric polymer, the polar solvent used in reducing ionic associations thereby reducing the viscosity of the neutralized cement, and the amount of water in the cement.

In order to have an economical process, it is necessary to sulfonate elastomeric polymer cements containing at least about 50 g elastomeric polymer per liter of non-reactive solvent. This situation occurs because in a commercial manufacturing process, solvents must be recovered and recycled. The more solvent recycled per unit elastomeric polymer product, the more expensive the product. In the instant invention, the preferred elastomeric polymer concentration in non-reactive solvent is at least about 50 g/liter.

In addition, it is necessary that the elastomeric polymer cements be low in viscosity. Sulfonation of the polymer cement does not result in substantial viscosity increases; however, neutralization results in very large solution viscosity increases, or in the extreme gel, due to the ionic associations. Therefore, it is important to keep the starting cement viscosities low by using polymer concentrations as low as economically feasible. However, high polymer concentrations are still possible if the molecular weights or Mooney viscosities are low. It is important therefore in the practice of this invention to use elastomeric polymers with as low Mooney viscosities as possible.

It has been found that neutralized sulfonated polymers possess good physical properties even if the Mooney viscosity (ML, 1+8, 212° F.) of the starting polymer is about 5. On the other hand, at the high Mooney viscosities when cements containing 50 g polymer/liter solvent are sulfonated and neutralized extremely high final cement viscosities are obtained. The process of this invention can be practiced when the elastomeric polymer cement at a concentration of 50 g polymer/liter of non-reactive solvent possesses at 25° C. a Brookfield viscosity at 0.6 rpm of 2500 centipoise (cps) or less. The Mooney viscosity (ML, 1+8, 212° F.) of the elastomeric polymer is preferably about 5 to about 60, more preferably about 10 to about 50, and most preferably about 15 to about 25.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin; preferably about 0.5 to about 6%; more preferably about 1 to about 4%, e.g. 2%. Illustrative of such a Butyl rubber is Exxon Butyl 365 (Exxon Chemical Co.), having a mole % unsaturation of about 2.0 and a Mooney viscosity (ML, 1+8, 212° F.) of about 45. Very low molecular weight Butyl rubbers, i.e. Butyl rubbers having a viscosity average molecular weight of about 5,000 to 85,000 and a mole % unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM D-1418-64 and is intended to mean a terpolymer containing ethylene and propylene in the backbone and unsaturation in a side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 75 wt. % ethylene and about 1 to about 10 wt. % of a diene monomer, the balance of the polymer being propylene. Preferably, the polymer contains about 45 to about 70 wt. % ehtylene, e.g. 50 wt. % and about 2.6 to about 8.0 wt. % diene monomer, e.g. 5.0 wt. %. The diene monomer is preferably a non-conjugated diene. Illustrative of these non-conjugated diene monomers which may be used in the EPDM terpolymer (EPDM) are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene, and 5.0 wt. % of 5-ethylidene-2-norbornene with an $\overline{M}n$ as measured by GPC of about 47,000, and $\overline{M}v$ as measured by GPC of about 145,000 and an $\overline{M}w$ as measured by GPC of about 174,000. Another EPDM terpolymer, Vistalon 2504-20 is derived from Vistalon 2504 (Exxon Chemical Co.) by a controlled extrusion process, wherein the resultant Mooney viscosity (ML, 1+8, 212° F.) is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

The olefinically unsaturated polymer is dissolved in a suitable non-reactive solvent at a concentration level of about 2 to about 25 wt. %, more preferably at about 5 to about 20 and most preferably at about 10 to about 15. Suitable solvents for solfonation are selected from the group consisting of chlorinated aliphatic hydrocarbons such as 1,2-dichloroethane, halogenated aromatic hydrocarbons such as chlorobenzene, alicyclic hydrocarbons such as cyclohexane and aliphatic hydrocarbons having about 4 to about 7 carbon atoms, more preferably 5 to 6, such as isomeric pentanes and hexanes and mixtures thereof. In terms of an economical process, halogenated solvents are less preferred as well as solvents boiling above about 80° C. Preferred solvents are hydrocarbons boiling at about or below 80° C. such as hexane and cyclohexane. The most preferred solvents are the saturated aliphatic hydrocarbons containing from 4 to 6 carbon atoms and mixtures thereof. The olefinically unsaturated polymer dissolved in the solvent is contacted in the reaction zone with a sulfonating agent selected from the group consisting of an acyl sulfate, or a sulfur trioxide donor complexed with a Lewis base containing oxygen, sulfur or phosphorous. The term "sulfur trioxide donor" as used in the specification means a compound containing available sulfur trioxide. Illustrative of such sulfur trioxide donors are $SO_3$, chlorosulfonic acid, and fluorosulfonic acid. The term "complexing agent" as used in the specification means a Lewis base, wherein Lewis base is an electron pair donor. Illustrative of Lewis bases suitable for use as complexing agents are certain phosphorous compounds. While the phosphorous compound may be either inorganic or organic, it is preferred that the phosphorous compound be an organic compound. Various organic phosphites, phosphinites, phosphinates, phosphates, phosphonates, phosphonites and phosphines may be used as the complexing agent. The organic substituents consist of $C_1$ to $C_{10}$ alkyl, aryl, alkaryl, or aralkyl groups. The nitrogen containing Lewis bases form highly stable complexes with sulfur trioxide donors and are not considered suitable for sulfonation of the unsaturated polymers of this invention. Other Lewis bases suitable as complexing agents are those Lewis bases which contain oxygen or sulfur. Ethers are thioethers have been found useful for complexing sulfur trioxide donor to moderate reaction with the unsaturation of polymer molecules. The ethers and thioethers may contain one, two or more ether oxygens or sulfurs and may be linear or cyclic. Illustrative of the ether Lewis bases suitable for use in the practice of this invention are tetrahydrofuran, p-dioxane, 2,3-dichloro-1,4-dioxane, m-dioxane, 2,4-dimethyl-1,3-dioxane, 2-phenyl-1,3-dioxane, diethyl ether, trioxane, and bis (2-chloroethyl)ether. The preferred oxygen containing bases are p-dioxane, tetrahydrofuran and bis-(2-chloroethyl) ether. Illustrative of the thioethers are diethyl sulfide and tetrahydrothiophene. Other oxygen containing Lewis bases suitable as complexing agents are carboxylic acid esters wherein the carboxylic acid is a $C_1$ to $C_{10}$ aliphatic acid, benzoic acid, or phenylacetic acid. Illustrative of such esters are benzyl acetate, butyl acetate, butyl propionate, methyl benzoate, p-nitrophenyl acetate, ethyl-n-butyrate, ethyl stearate, and ethyl phenyl acetate. The molar ratio of $SO_3$ donor to complexing agent may be as high as 15 to 1; preferably less than about 9:1; more preferably about 4:1 to about 1:1, e.g. 2:1. The preferred solvents for preparation of the complexes of sulfur trioxide donor with complexing agents containing oxygen or sulfur are chlorinated hydrocarbons. Illustrative of such chlorinated solvents are carbon tetrachloride, dichloroethane, chloroform, and methylene chloride. The complexes may also be prepared by direct addition of reagents, if precautions are taken to dissipate evolved heat. The reactions of ethereal complexes of $SO_3$ with the unsaturation of polymer chains has been found to be non-quantitative. Therefore, the use of excess complex is required to give the desired level of sulfonation.

The preferred sulfonating agents of the instant invention are the acyl sulfates, in particular acetyl sulfate. The acyl sulfates which are selected from the group consisting of acetyl, propionyl, butyrl, or benzoyl sulfate, in particular acetyl sulfate. The acyl sulfate may be produced by reacting concentrated sulfuric acid with an acid anhydride. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, sulfur trioxide may be reacted with acetic acid to form the acetyl sulfate.

The preferred sulfonating agent is acetyl sulfate which can be prepared according to the following equations:

$R-COOH + SO_3 \rightarrow R-COO-SO_3H$ $(R-CO)_2O + H_2SO_4 \rightarrow R-COO-SO_3H + R-COOH$ $R-CO-X + H_2SO_4 \rightarrow RCOO-SO_3H + H-X$ $R-COOH + ClSO_3H \rightarrow R-COO-SO_3H + HCl$ $R-COONa + ClSO_3H \rightarrow R-COO-SO_3H + NaCl$ $(RCO)_2O + ClSO_3H \rightarrow R-COO-SO_3H + RCOCl$ Sulfonation of the polymer is conducted at a temperature between $-100°$ C. and $+100°$ C., wherein the reaction time is about 1 to about 60 minutes, more preferably about 5 to about 45 minutes and most preferably about 15 to about 30 minutes.

The sulfonation of less substituted olefinic structures, such as derived from 1,4-hexadiene terpolymers requires somewhat higher temperatures, e.g. 50° C. when unsaturation levels are low, e.g. less than 2 mole %. More highly substituted olefinic structures, such as that derived from 5-ethylidene-2-norbornene, are rapidly sulfonated at room temperature and below even at low levels of unsaturation. The product remains soluble throughout the reaction. It should be pointed out that neither the sulfonating agent nor the manner of sulfonation is critical, provided that the sulfonating method does not degrade or cross-link the polymer backbone.

The amount of desirable sulfonation depends on the particular application. Preferably, the elastomeric polymer is sulfonated at about 10 to about 60 meq. sulfonate groups/100 grams of polymer, more preferably at about 15 to about 50 meq. sulfonate groups/100 grams of polymer, and most preferably at about 20 to about 40 meq. sulfonate groups/100 grams of polymer. The meq. of sulfonate groups/100 grams of polymer is determined by dissolving the unneutralized sulfonated polymer in a mixed solvent of 95 parts of toluene and 5 parts of methanol at a concentration level of 50 grams per liter of solvent. The unneutralized sulfonated polymer is titrated with sodium hydroxide in ethanol to an Alizarin-Thymolphthalein end point. The sulfonate level can also be determined from sulfur content which is obtained by Dietert Analysis.

Polymers containing unsaturation and unneutralized sulfonate groups have been found to be somewhat deficient in thermostability. Therefore, it is necessary to neutralize a substantial portion of the unneutralized sulfonate groups as part of the process for the manufacture of the sulfonated elastomeric polymer. Neutralization further improves the physical properties of the sulfonated polymer. In preparing the ionomer it is desirable to neutralize essentially every sulfonate group. In the instant invention, neutralizing agent is added in sufficient excess to insure the neutralization of all the sulfonate groups.

When the molecular weight of the elastomeric polymer or the concentration of the elastomeric polymer in the non-reactive solvent is too high or when the sulfonate content of the elastomeric polymer is high, gelation can occur due to the ionic interactions between the unneutralized sulfonate groups during sulfonation or between the neutralized sulfonate groups after neutralization. The ionic associations of the sulfonate groups are dissipated by ionic group plasticizers such as polar hydrocarbons.

Neutralization of the sulfuric acid groups can be effected through zinc salts of carboxylic acids having about 1 to about 4 carbon atoms, in particular zinc acetate dissolved in water. However, extremely high cement viscosities or gels can develop due to the effects of the water added during neutralization thereby producing neutralized sulfonated elastomeric cements which cannot be stirred, pumped, poured or otherwise easily handled. Since it is necessary to convert the unneutralized sulfonate groups to the zinc sulfonate, it is necessary that these neutralizing agents be soluble in a solvent, even if that solvent is not miscible with the sulfonation cement. A large class of possible metal neutralizing agents which might be suitable for this invention are not sufficiently soluble in any organic type solvent. The only effective, available, inexpensive and easy to handle solvent is water. As a consequence, the problem of high viscosity or gelation during the neutralization of sulfonation cements can only be overcome by lowering the amount of water present in the neutralization system. The only effective manner in which this can be done is to choose a neutralization agent such as zinc acetate which has a sufficiently high degree of solubility in a polar organic solvent such as methanol.

If the sulfonation cement at the end of the sulfonation is neutralized with an aqueous solution of the zinc acetate in the absence of a polar solvent severe gelation occurs. This gelation is not due to covalent cross-linking but due to the ionic associations between the metal sulfonated groups. This gelation can be eliminated by using a solution of the zinc acetate dissolved in methanol; however, in order to have an economical process, it is necessary to keep the methanol concentration below about 10 volume % of the non-reactive solvent, more preferably less than about 8 volume %, and most preferably less than about 5 volume %. When the methanol concentration is below 5 volume % it is preferred not to recycle the methanol but to discharge the methanol into a biological pond for disintegration of the methanol. When higher levels of zinc acetate are required as a neutralizing agent, it is not possible to fully dissolve the required amount of zinc acetate in pure methanol, wherein the methanol level is maintained at a concentration of less than 10 volume % of the non-reactive solvent and even becomes more difficult in the most preferred embodiment wherein the volume % of methanol is less than 5. The minimum volume % of methanol based on the volume % of non-reactive solvent is at least about 2, more preferably about 2.5; and most preferably about 3. When water is employed, the volume % of water in the mixed solvent of water and methanol is less than about 25; more preferably less than about 20 and most preferably less than about 15. The concentration of zinc acetate dihydrate agent in the solvent system which can be either methanol alone or a mixture of water and methanol system, is about 5 to about 35 grams per 100 ml. of solvent; more preferably about 10 to about 30; and most preferably about 15 to about 25.

At the higher methanol concentrations, the neutralized cement viscosities are the lowest and the most desirable; however, it is desirable to keep the methanol concentrations low in order to prevent polymer precipitation and to facilitate the separation of solvent from methanol after the solvent is evaporated from the polymer in the steam stripping operation.

The amount of water is kept at a minimum and is generally dictated not only by the solubility of the neutralizing agent but also the concentration of the base polymer, the concentration of the unneutralized sulfonate groups, and the desired ratio of metal ion to unneutralized sulfonate groups in the neutralized cement. Water concentration of about 3.5 volume % or less based on the volume of the non-reactive solvent, more preferably less than about 2.5 volume % and preferably less than about 1.5 volume % is effective in producing cements with sufficiently low viscosities. The viscosities of the neutralized cements are considered processable, when the room temperature Brookfield viscosities do not exceed 50,000 centipoise (cps) at 0.6 rpm, preferably less than 20,000 cps and most preferably about 1000 to about 10,000 cps.

It should be apparent to those skilled in the art that those neutralized cements having viscosities of about 20,000 to about 50,000 cps are not as readily processed at ambient temperatures. It is usually observed, however, that increasing the temperature of the cement by 10° to 25° C. above room temperature is effective in lowering the cement viscosity to a more desirable lower range below 50,000 cps. Therefore, it is within the spirit of this invention to include those cements whose viscosities at room temperature are above 50,000 cps but which can be further lowered to some extent by increasing the temperature of said cements.

To the neutralized cement of the sulfonated elastomeric polymer can optionally be added a linear, saturated organic carboxylic acid having about 10 to about 40 carbon atoms, more preferably about 12 to 26 carbon atoms, and most preferably about 14 to about 20 carbon atoms. The most preferred acid is stearic acid, wherein the carboxylic acid reacts with excess zinc acetate neutralizing agent to form the zinc salt of the higher molecular weight carboxylic acid which is a preferential plasticizer for the zinc neutralized sulfonate groups of the sulfonated elastomeric polymer. Sufficient organic carboxylic acid is added to form less than about 35 parts per hundred by weight of the zinc salt of the organic acid based on 100 parts of the neutralized sulfonated elastomeric polymer; more preferably less than about 30 and most preferably about 8 to about 30.

The order of addition of the zinc acetate dissolved in the solvent system and the stearic acid is critical. If stearic acid is first added to the sulfonated cement prior to the addition of the zinc acetate in the solvent system, the stearic acid reacts with the methanol to form methyl stearate. The formation of methyl stearate has an adverse effect on both the tensile properties and the rheological properties. The formation of methyl stearate can be eliminated and the formation of zinc stearate can be maximized by practicing the teachings of the invention, that is, by first adding the zinc acetate to the sulfonated cement followed by the subsequent addition of the stearic acid thereby forming the preferred preferential plasticizer, zinc stearate, in situ.

The metal neutralized sulfonated elastomeric polymer prepared according to this present invention, can be isolated as a crumb by steam stripping. No surface active agents are needed to prepare the easy handling crumb. The crumb that is obtained is easily washed to remove water soluble impurities such as acetic acid and methanol and is suitable to be fed into a dewatering extruder or to be dried in a fluid bed dryer.

The resultant zinc neutralized sulfonated elastomeric polymers have higher incorporation levels of zinc, namely 80–90% as compared to the incorporation levels of 65–70%, if isopropanol was employed in place of the methanol. This is due to the more facile formation of the zinc stearate from zinc acetate and stearic acid in methanol as compared to isopropanol. The zinc stearate formation in isopropanol is both slow and low in yield whereas in methanol its formation is fast and high in yield. Consequently, less zinc acetate must be used in the methanol process. The physical properties such as tensile strength and compression set are uniformly high for the zinc neutralized sulfonated elastomeric polymer prepared according to the methanol process as compared to an isopropanol process. This enhancement in physical properties is theorized to be probably attributable to the formation of high concentrations of zinc stearate in situ and consequently lower concentrations of stearic acid, when one employs the methanol process.

The higher conversion of stearic acid to zinc stearate when methanol is used permits the use of lower quantities of zinc acetate which further permits the use of less methanol, thereby making the process more economical, or less water, thereby producing cements which are lower in viscosity and more readily processable.

DETAILED DESCRIPTION

The improved process of the present invention can be more readily appreciated by reference to the following FIGURE, examples, and tables.

EXAMPLE 1

The solubility characteristics of zinc acetate dihydrate in methanol-water mixtures were determined. Ten grams of $Zn(OOCCH_3)_2.2H_2O$ was placed into an Erlenmeyer flask and a given amount of methanol was added. The contents were stirred with a magnetic stirring bar. When solution did not occur water was added incrementally until solution occurred. The solubility of zinc acetate dihydrate is illustrated in the FIGURE where the relative amounts of methanol and water required to dissolve 1.0 gram of the salt are plotted against each other. The solubility of zinc acetate dihydrate in methanol on the one hand and water on the other is substantially different. However, as the FIGURE shows a relatively small amount of water greatly enhances the solubility of zinc acetate dihydrate in methanol. Almost 15.5 ml. of pure methanol is required to dissolve 1.0 g of the salt whereas only about 4.0 ml. of methanol is required when an additional 0.3 ml. of water is used.

The ability of small amounts of water to markedly enhance the solubility of zinc acetate in methanol thereby provides for an economical manufacturing process for zinc sulfonate containing EPDM. It is necessary that the zinc acetate neutralizing agent be added as a solution in order to effect neutralization and in most instances the zinc acetate required for this neutralization and for other purposes is not soluble in a sufficiently small amount of methanol to be economical. In addition a large amount of methanol will render the polymer insoluble by virtue of its incompatability with the hydrocarbon backbone rather than through any changes in ionic association. The zinc acetate requirements for neutralization of 100 grams of sulfonated polymer in 1000 ml. non-reactive solvent for practically all of the desirable gum compositions covers a range of zinc acetate levels requiring from about 100 ml. to about 250 ml. methanol, or from about 10 to about 25 volume % methanol based on non-reactive solvent. These levels of methanol increase the cost of the manufacturing process and can result in polymer precipitation. Consequently, these higher alcohol levels are undesirable. They are readily avoided through the use of small amounts of water.

EXAMPLE 2

Vistalon 2504 (Exxon Chemical Co.) was decreased in molecular weight through a hot extrusion process from its original Mooney viscosity (ML, 1+8, 212° F.) of about 40 to a Mooney viscosity of about 20. Vistalon 2504 contains about 50 wt. % ethylene, about 45 wt. % propylene and about 5 wt. % 5-ethylidene-2-norbornene.

In 5000 ml. of hexane was dissolved 500 g of the 20 Mooney EPDM. To the cement was added 28.7 ml. of acetic anhydride (304 mmoles) followed by 10.5 ml. of concentrated sulfuric acid (187.5 mmoles). After 30 minutes the sulfonated cement was neutralized and simultaneously deactivated through the addition of a solution of 33.0 g zinc acetate dihydrate (300 meq.) in 250 ml. methanol and 10 ml. water. The methanol was 5 volume % on hexane, and the water was 0.2 volume % on hexane. The Brookfield viscosity of the resultant cement was then obtained at room temperature over a range of shear rates. Viscosity data are given in Table I.

The resultant cement was low in viscosity and could easily be stirred, poured, or pumped.

TABLE I

BROOKFIELD VISCOSITY OF UNPLASTICIZED, NEUTRALIZED SULFONATED EPDM CEMENT
25° C. Spindle 3

| rpm | Viscosity, cps |
|---|---|
| 0.3 | 6000 |
| 0.6 | 3200 |
| 1.5 | 1920 |
| 3.0 | 1600 |
| 6.0 | 1700 |
| 12.0 | 1550 |
| 30.0 | 1400 |
| 60.0 | 1300 |

EXAMPLE 3

Zinc sulfonate EPDM when formulated requires the presence of some ionic plasticizer in order to provide for a sufficiently low melt viscosity for ready processability in operations such as injection molding and extrusion. Effective plasticizers are stearic acid and zinc stearate. Stearic acid can be added to the cement during the process of neutralization and either some of it or all of it can be converted to the more desirable zinc stearate through the proper control of zinc acetate concentration as well as the process conditions.

This series of runs will demonstrate that it is possible for undesirable methyl stearate to form under certain process conditions. In order to determine how extensive the methyl stearate formation was the effect of reaction time was studied.

The 20 Mooney V-2504 (100 g) described in Example 2 was dissolved in 1000 ml. hexane and sulfonated with 5.74 ml. of acetic anhydride and 2.10 ml. concentrated sulfuric acid (37.5 mmoles). Samples for sulfur analysis were taken, and the polymeric sulfonate was isolated by steam stripping and drying on a rubber mill. The sulfonation mixture was inactivated with 30 ml. methanol. Then 25.6 g (90 mmoles) of stearic acid was added. In four separate runs (A-D, Table II) the reaction mixture was stirred for 15, 30, 60, and 120 minutes. The cements were then neutralized with a solution of 9.88 g (90 meq.) of zinc acetate dihydrate in 50 ml. methanol and 2 ml. water. After stirring 30 minutes 0.5 g of Antioxidant 2246 was added, and the resultant plasticized and neutralized sulfonated EPDM was isolated through steam stripping and drying the wet polymer on a rubber mill at about 200° F. Data on these four runs is given in Table II.

Infra-red spectra on thin films of the above polymers were obtained. After only 15 minutes stearic acid contact time (A) a substantial amount of methyl stearate (carbonyl band at about 1745 cm$^{-1}$) had already formed. After 60 minutes (C) hardly any stearic acid was present, and after 120 minutes (D) virtually none was present but the methyl stearate content was substantial.

Two more sulfonations were made (E-F, Table II) as described above. However, in these two instances inactivation and neutralization were effected simultaneously after 30 minutes of sulfonation. Stearic acid (90 mmoles) was added along with 0.5 g Antioxidant 2246, and the resultant cements were stirred for 30 minutes (E) and for 24 hours (F). The polymers were isolated as described above. Data on these runs also are given in Table II.

Infra-red examination of these two samples showed only trace quantities of methyl stearate even after 24 hours of stirring. These runs show that no esterification is occurring after neutralization. This means that not only is methyl stearate not forming but also that methyl acetate is not forming. It is important in a successful process to avoid the formation of such by-products which might interfere with product performance and which could increase the complexity and the cost of the manufacturing process.

TABLE II

ESTER FORMATION DURING SULFONATION INACTIVATION

| Run | A | B | C | D | E | F |
|---|---|---|---|---|---|---|
| Inactivation First | Yes | Yes | Yes | Yes | No | No |
| Methanol, ml. | 30 | 30 | 30 | 30 | 0 | 0 |
| Time Between Stearic Acid Addition and Isolation, Hours | 0.25 | 0.50 | 1.0 | 2.0 | 0.50 | 24 |
| Neutralization | | | | | | |
| Zn(OOCCH$_3$)$_2$ . 2H$_2$O, meq. | 90 | 90 | 90 | 90 | 90 | 90 |
| Methanol, ml. | 50 | 50 | 50 | 50 | 80 | 80 |
| Water, ml. | 2 | 2 | 2 | 2 | 2 | 2 |
| Product Properties | | | | | | |
| Sulfonate Content, meq./100 EPDM | 36.6 | 34.0 | 36.0 | 36.6 | 34.7 | 34.0 |
| At 25° C. | | | | | | |
| Tensile Strength, psi | 1950 | — | — | 1815 | 2785 | — |
| 300% Modulus, psi | 355 | — | — | 420 | 460 | — |
| Elongation, % | 665 | — | — | 625 | 630 | — |

EXAMPLE 4

A series of fourteen runs was made to demonstrate the effects of methanol and water concentration on the viscosity of the cement of the neutralized and stearic acid plasticized sulfonated EPDM.

The 20 Mooney Vistalon 2504 of Example 2 was sulfonated as described in Example 3. After 30 minutes of sulfonation the cement was inactivated and neutralized with a solution of zinc acetate dihydrate in the mixtures of methanol and water shown in Table III. Samples for sulfur analysis were withdrawn just prior to neutralization. After 5 minutes 90 mmoles of stearic acid was added along with 0.5 g Antioxidant 2246, and the cement was stirred for 30 minutes. The product was then isolated immediately by steam stripping, and the polymer was water washed in a Waring blender. The resultant wet crumb was dried on a two-roll mill at about 220° F.

Brookfield viscosities of the final cements were determined at room temperature over a range of shear rates. Viscosities are given in Table III. These data clearly show the dramatic effects of methanol and water concentration upon cement viscosity. At a level of 4 volume % methanol on hexane only about 1 volume % water produced a viscosity of greater than 37,000 cps at 0.6 rpm. Thus at very low levels of methanol it is critical to keep the water level very low in order to obtain cement viscosities which are low enough for the cements to be easily processed. Increasing the amount of methanol decreases the cement viscosity and allows more water to be used, if desired.

It is, of course, most desirable to keep the methanol concentration low. However, in order to dissolve the zinc acetate dihydrate at low methanol levels it is necessary to use some water to dissolve the zinc acetate. The use of too much water and too little methanol results in cement viscosities which are too high. Suitable balances can be obtained which give low cement viscosities, complete zinc acetate solubilities, and low methanol concentrations.

The sulfur and zinc contents of the fourteen gums are given in Table IV. Within experimental error the sulfur contents and zinc contents were identical and did not change with changing concentrations of methanol and water used in the process.

Melt viscosities of selected gums were obtained with an Instron capillary rheometer at 200° C. and over a range of shear rates. Apparent viscosities for three shear rates are given in Table IV as well as the shear rate at which melt fracture occurred. Again within experimental error the gums produced possessed identical properties. Thus over the range of methanol and water levels studied product compositions and product properties were identical.

EXAMPLE 5

Stearic acid is an ionic plasticizer for zinc sulfonate EPDM. It markedly improves melt flow; however, tensile properties, especially those at somewhat elevated temperatures, deteriorate or are not improved. Zinc stearate on the other hand exerts about the same effect on melt flow than does stearic acid; however, zinc stearate rather remarkably improves tensile properties at both room temperature and at 70° C.

Virtually all formulations derived from zinc sulfonate EPDM do require some sort of an ionic plasticizer, and zinc stearate is the plasticizer of choice. It is possible to prepare the unplasticized gum and post add the zinc stearate but the unplasticized gum has a high viscosity and it is difficult to mix. Also the wet crumb of unplasticized gum after manufacture and isolation cannot be dried by such commonly used techniques as extrusion dewatering. It is desirable to have zinc stearate in the gum prior to isolation, drying and compounding.

Of course, zinc stearate can be added to the neutralized cement prior to isolation. This requires a dispersion step. In addition zinc stearate is costly.

It is possible to more economically generate zinc stearate during the neutralization step through the addition of stearic acid and a sufficient excess of zinc acetate neutralizing agent. Thus through the simple adjustment of zinc acetate concentration it is possible to prepare zinc stearate plasticized gums which possess sufficiently

TABLE III

| | BROOKFIELD VISCOSITIES OF NEUTRALIZED CEMENTS | | | | | | | | | | | | | |
|---|---|---|---|---|---|---|---|---|---|---|---|---|---|---|
| Run | A | B | C | D | E | F | G | H | I | J | K | L | M | N |
| Methanol, ml. | 40 | 40 | 40 | 60 | 60 | 60 | 60 | 80 | 80 | 80 | 80 | 100 | 100 | 100 |
| Water, ml. | 3 | 6 | 11 | 3 | 6 | 11 | 15 | 2 | 3 | 6 | 11 | 1 | 3 | 6 |
| Brookfield Viscosity, cps | | | | | | | | | | | | | | |
| RPM | | | | | | | | | | | | | | |
| 0.3 | 19200 | 12000 | 58400 | 12000 | 33600 | 18800 | 38000 | 16800 | 12800 | 17200 | 20400 | 11600 | 16800 | 18000 |
| 0.6 | 10400 | 10400 | 37200 | 7600 | 19000 | 17200 | 30400 | 12600 | 9200 | 10000 | 12000 | 6800 | 10800 | 14800 |
| 1.5 | 8000 | 7040 | 36400 | 4880 | 8720 | 13040 | 22400 | 7200 | 6560 | 7280 | 7760 | 5040 | 7120 | 8880 |
| 3.0 | 6800 | 6760 | 32720 off | 4240 | 6560 | 11280 | 18400 | 6280 | 4400 | 6920 | 6800 | 4360 | 5120 | 6920 |
| 6.0 | 5680 | 6680 | scale off | 3700 | 5280 | 10380 | 16800 off | 4700 | 3580 | 5120 | 6800 | 3800 | 4420 | 5680 |
| 12.0 | 4840 | 5950 | scale | 3490 | 5150 | 8960 | scale | 3960 | 3020 | 5610 | 6550 | 3910 | 3550 | 4620 |
| 30.0 | off scale | off scale | off scale | 3080 | off scale | off scale | off scale | 3456 | 2420 | off scale | off scale | 3360 | 3176 | off scale |

TABLE IV

| | Weight %, S | Weight %, Zn | Apparent Viscosity at 200° C., Poise × 10$^{-5}$ | | | Melt Fracture Shear Rate |
|---|---|---|---|---|---|---|
| Run | | | 0.73 sec$^{-1}$ | 7.3 sec$^{-1}$ | 73 sec$^{-1}$ | |
| A | 1.04 | 1.81 | 3.3 | 1.2 | 0.3 | 2911 |
| B | 1.04 | 1.89 | — | — | — | — |
| C | 1.01 | 2.03 | — | — | — | — |
| D | 1.01 | 1.93 | 4.2 | 1.4 | 0.3 | 2911 |
| E | 1.05 | 1.98 | 2.9 | 1.1 | 0.3 | 2911 |
| F | 1.09 | 2.01 | 3.7 | 1.3 | 0.3 | 2911 |
| G | 1.02 | 2.00 | 3.3 | 1.2 | 0.3 | 2911 |
| H | 1.03 | 1.92 | — | — | — | — |
| I | 1.02 | 1.76 | 3.3 | 1.2 | 0.3 | 2911 |
| J | — | 1.90 | — | — | — | — |
| K | 1.04 | 1.83 | — | — | — | — |
| L | 1.04 | 2.00 | — | — | — | — |
| M | 1.01 | 1.89 | 2.9 | 1.1 | 0.3 | 2911 |
| N | 1.11 | 1.90 | — | — | — | — | low melt viscosity for ease of compounding and exceptional physical properties. In a copending application (U.S. Ser. No. 855,762) a process for the preparation of metal sulfonate containing EPDM's is described wherein isopropanol is used as a polar cosolvent. It has been found that surprisingly the use of methanol as a cosolvent improves both the rate of formation and the yield of zinc stearate over isopropanol. In a practical sense this means that less zinc acetate needs to be used for the combination of neutralization and zinc stearate formation. In terms of the process wherein methanol is used this means that either less methanol can be used to make the process even more economical or that less water is necessary to dissolve the zinc acetate resulting in lower cement viscosities.

In this example two series of runs were made using methanol as a neutralization cosolvent and isopropanol as a neutralization cosolvent. Twelve runs were made in each series wherein both the amount of stearic acid plasticizer and the amount of zinc acetate neutralizing agent were varied. These variations are shown in Table V.

All sulfonations were made on 100 g of the 20 Mooney Vistalon 2504 described in Example 2 in 1000 ml. hexane with in situ acetyl sulfate generated through the addition of 60.75 mmoles acetic anhydride followed by 37.5 mmoles of concentrated sulfuric acid for 30 minutes at room temperature.

In the methanol process termination and neutralization were effected simultaneously by adding a solution of zinc acetate in 80 ml. methanol and 3 ml. water. The stearic acid was added along with 0.5 g Antioxidant 2246, and the neutralized mixture was stirred for 2 hours before steam stripping and work-up.

In the isopropanol process the sulfonation was terminated with 150 ml. isopropanol followed by a solution of zinc acetate in 25 ml. water. The stearic acid was added with 0.5 g Antioxidant 2246, and the cement was stirred for 2 hours before stripping and work-up.

After stripping the gums were pulverized with water in a Waring blender, and the resultant crumbs were dewatered and dried on a rubber mill at about 230° F.

The sulfur and zinc contents were determined and are given in Table V. Infra-red spectra on thin films of the gums were obtained. The completeness of the conversion of stearic acid to zinc stearate was followed with the stearic acid carbonyl band at 1710 cm$^{-1}$.

The infra-red spectra showed that about 30 meq. of zinc acetate/100 EPDM less than in the isopropanol process was required in the methanol process to produce an equivalent amount of zinc stearate. This effect was also manifested in the zinc contents of the gums. The zinc contents of the methanol process gums are uniformly higher than those of the isopropanol process.

The real significance of the efficient production of zinc stearate is demonstrated in Table VI where the tensile properties at room temperature and 70° C. and the melt index of all of the gums are tabulated. The melt indexes of the methanol and isopropanol gums are comparable which is to say that stearic acid and zinc stearate are excellent but equivalent ionic plasticizers. Substantial differences in tensile properties of the methanol gums and the isopropanol gums are obtained. These differences are due simply to the relative amounts of stearic acid present. Zinc stearate markedly enhances tensile properties while stearic acid is deleterious to tensile properties, especially at 70° C.

TABLE V

| Run No. | Alcohol | Zn(OAc)$_2$ · 2H$_2$O/ 100 EPDM Meq. | Weight, g. | Stearic Acid/ 100 EPDM Mmoles | Weight, g. | Unneutralized Sulfonated Gum Sulfur, Wt. % | Sulfonate Content Meq./ 100 EPDM | Neutralized Gum Sulfur, Wt. % | Zinc Content Wt. % | Meq./ 100 EPDM | Stearic Acid Carbonyl Peak At 1710 cm$^{-1}$ in Infra-red |
|---|---|---|---|---|---|---|---|---|---|---|---|
| A-1 | MEOH | 60  | 6.59  | 30 | 8.53  | 0.95  | 30.4 | 1.01 | 1.59 | 54  | Small |
| B-1 | MEOH | 90  | 9.88  | 30 | 8.53  | 1.045 | 33.6 | 0.96 | 2.34 | 80  | Nil |
| C-1 | MEOH | 120 | 13.17 | 30 | 8.53  | 1.09  | 35.1 | 1.02 | 3.00 | 103 | Nil |
| D-1 | MEOH | 150 | 16.46 | 30 | 8.53  | 1.015 | 32.5 | 0.96 | 3.40 | 117 | Nil |
| E-1 | MEOH | 60  | 6.59  | 60 | 17.07 | 1.005 | 32.2 | 0.90 | 1.46 | 54  | Medium |
| F-1 | MEOH | 90  | 9.88  | 60 | 17.07 | 1.105 | 35.5 | 0.94 | 2.12 | 78  | Small |
| G-1 | MEOH | 120 | 13.17 | 60 | 17.07 | 1.07  | 34.3 | 0.90 | 2.75 | 102 | Nil |
| H-1 | MEOH | 150 | 16.46 | 60 | 17.07 | 1.12  | 36.0 | 0.98 | 3.39 | 126 | Nil |
| I-1 | MEOH | 60  | 6.59  | 90 | 25.60 | 1.13  | 36.3 | 0.83 | 1.28 | 51  | Large |
| J-1 | MEOH | 90  | 9.88  | 90 | 25.60 | 1.075 | 34.5 | 0.85 | 1.73 | 69  | Medium |
| K-1 | MEOH | 120 | 13.17 | 90 | 25.60 | 1.075 | 34.5 | 0.82 | 2.60 | 103 | Small |
| L-1 | MEOH | 150 | 16.46 | 90 | 25.60 | 1.005 | 32.2 | 0.85 | 4.12 | 163 | Trace |
| A-2 | IPOH | 60  | 6.59  | 30 | 8.53  | 1.005 | 32.2 | 1.01 | 1.35 | 46  | Small |
| B-2 | IPOH | 90  | 9.88  | 30 | 8.53  | 1.045 | 33.6 | 0.95 | 1.95 | 67  | Nil |
| C-2 | IPOH | 120 | 13.17 | 30 | 8.53  | 0.995 | 31.9 | 1.02 | 1.94 | 66  | Nil |
| D-2 | IPOH | 150 | 16.46 | 30 | 8.53  | 1.075 | 34.5 | 0.96 | 2.99 | 103 | Nil |
| E-2 | IPOH | 60  | 6.59  | 60 | 17.07 | 1.025 | 32.8 | 0.90 | 1.09 | 40  | Large |
| F-2 | IPOH | 90  | 9.88  | 60 | 17.07 | 1.045 | 33.6 | 0.93 | 1.69 | 62  | Large |
| G-2 | IPOH | 120 | 13.17 | 60 | 17.07 | 1.04  | 33.4 | 0.90 | 2.00 | 74  | Medium |
| H-2 | IPOH | 150 | 16.46 | 60 | 17.07 | 0.98  | 31.4 | 0.94 | 2.38 | 88  | V. Small |
| I-2 | IPOH | 60  | 6.59  | 90 | 25.60 | 1.065 | 34.2 | 0.81 | 0.77 | 30  | Large |
| J-2 | IPOH | 90  | 9.88  | 90 | 25.60 | 1.065 | 34.2 | 0.81 | 1.62 | 64  | Large |
| K-2 | IPOH | 120 | 13.17 | 90 | 25.60 | 1.045 | 33.6 | 0.77 | 2.76 | 109 | Medium |
| L-2 | IPOH | 150 | 16.46 | 90 | 25.60 | 1.065 | 34.2 | 0.88 | 2.58 | 102 | Small |

TABLE VI

| Run No. | Process | Zinc Acetate meq./Stearic Acid mmoles* | Room Temperature 300% Modulus, psi | Tensile Strength, psi | Elong. % | 70° C. 300% Modulus, psi | Tensile Strength, psi | Elong. % | Melt Index (190° C., 250 psi), g/10 min. |
|---|---|---|---|---|---|---|---|---|---|
| A-1 | MEOH | 60/30  | 570  | 1020 | 490 | 110 | 105 | 400  | 0.13 |
| B-1 | MEOH | 90/30  | 1000 | 3350 | 510 | 330 | 490 | 480  | 0.26 |
| C-1 | MEOH | 120/30 | 1320 | 3350 | 490 | 260 | 350 | 440  | 0.44 |
| D-1 | MEOH | 150/30 | 1070 | 3510 | 500 | 230 | 410 | 540  | 0.66 |
| E-1 | MEOH | 60/60  | 500  | 1360 | 560 | 60  | 50  | 800+ | 0.69 |
| F-1 | MEOH | 90/60  | 550  | 2040 | 570 | 120 | 250 | 900  | 0.48 |
| G-1 | MEOH | 120/60 | 1150 | 3810 | 500 | 290 | 720 | 670  | 0.85 |
| H-1 | MEOH | 150/60 | 1140 | 3730 | 510 | 340 | 550 | 460  | 1.01 |
| I-1 | MEOH | 60/90  | 490  | 1630 | 590 | 30  | 10  | 800+ | 2.76 |
| J-1 | MEOH | 90/90  | 510  | 2070 | 610 | 55  | 50  | 800+ | 2.10 |
| K-1 | MEOH | 120/90 | 550  | 2430 | 610 | 110 | 210 | 800+ | 1.33 |
| L-1 | MEOH | 150/90 | 970  | 4565 | 550 | 220 | 580 | 760  | 1.82 |

TABLE VI-continued

| Run No. | Process | Zinc Acetate meq./Stearic Acid mmoles* | Room Temperature | | | 70° C. | | | Melt Index (190° C., 250 psi), g/10 min. |
|---|---|---|---|---|---|---|---|---|---|
| | | | 300% Modulus, psi | Tensile Strength, % | Elong, psi | 300% Modulus, psi | Tensile Strength, % | Elong. | |
| A-2 | IPOH | 60/30  | 685  | 1650 | 500 | 100 | 110 | 540  | 0.15 |
| B-2 | IPOH | 90/30  | 1000 | 2970 | 480 | 245 | 370 | 520  | 0.16 |
| C-2 | IPOH | 120/30 | 1000 | 2675 | 480 | 255 | 350 | 470  | 0.25 |
| D-2 | IPOH | 150/30 | 1430 | 3560 | 460 | 300 | 530 | 510  | 0.46 |
| E-2 | IPOH | 60/60  | 540  | 1375 | 530 | 40  | 30  | 800+ | 0.74 |
| F-2 | IPOH | 90/60  | 500  | 1880 | 580 | 90  | 800+ | 0.58 | |
| G-2 | IPOH | 120/60 | 490  | 2040 | 610 | 110 | 170 | 800+ | 0.66 |
| H-2 | IPOH | 150/60 | 620  | 3090 | 570 | 180 | 370 | 760  | 1.20 |
| I-2 | IPOH | 60/90  | 610  | 1650 | 540 | 20  | 10  | 800+ | 3.17 |
| J-2 | IPOH | 90/90  | 560  | 2330 | 610 | 40  | 30  | 800+ | 1.85 |
| K-2 | IPOH | 120/90 | 600  | 2300 | 580 | 80  | 100 | 800+ | 1.63 |
| L-2 | IPOH | 150/90 | 620  | 2700 | 270 | 120 | 210 | 800+ | 1.53 |

*Per 100 EPDM

What is claimed is:

1. The process for preparing a cement of a zinc neutralized sulfonated polymer having a Brookfield viscosity at 0.6 rpm at room temperature of less than about 50,000 cps which comprises the step of neutralizing a sulfonated polymer dissolved in a non-reactive solvent with excess zinc acetate dissolved in a solvent system consisting of methanol or a mixture of methanol and water to form said zinc neutralized sulfonated polymer having about 10 to about 60 meq. of zinc sulfonate groups per 100 grams of zinc neutralized sulfonated polymer, wherein the volume % of methanol based on said non-reactive solvent is less than about 10.

2. The process according to claim 1 wherein said non-reactive solvent is selected from the group consisting of aromatic hydrocarbons, aliphatic hydrocarbons, and chlorinated aliphatic hydrocarbons and mixtures thereof.

3. The process according to claim 1 wherein said non-reactive solvent is an aliphatic hydrocarbon.

4. The process according to claim 1 further including the addition of a linear, saturated, long chain carboxylic acid subsequent to said neutralization with said zinc acetate, said excess zinc acetate reacting with said carboxylic acid thereby forming a zinc salt of said carboxylic acid in situ.

5. The process according to claim 4 wherein said carboxylic acid is stearic acid.

6. The process according to claim 1 wherein said zinc neutralized sulfonated polymer is removed from said gel-free cement by steam stripping.

7. The process according to claim 1 wherein said sulfonated polymer is formed from a hydrocarbon elastomeric polymer.

8. The process according to claim 7 wherein said hydrocarbon elastomeric polymer is selected from the group consisting of Butyl rubbers and EPDM terpolymers.

9. The process according to claim 8 wherein said EPDM terpolymer consists essentially of about 40 to about 70 wt. % of ethylene, of about 10 to about 53 wt. % of propylene, and of about 2 to about 10 wt. % of a non-conjugated diene.

10. The process according to claim 9 wherein said non-conjugated diene is selected from the group consisting of 1,4-hexadiene, dicyclopentadiene, alkylidene substituted norbornenes, alkenyl substituted norbornenes, tetrahydroindene, and alkyl substituted tetrahydroindenes.

11. The process according to claim 10 wherein said non-conjugated diene is 5-ethylidene-2-norbornene.

12. A neutralized sulfonated elastomeric composition comprising:
(a) a neutralized sulfonated Butyl rubber having a Mooney viscosity (M.L., 1+8, 212° F.) of about 20 or less and having about 10 to about 60 meq. zinc sulfonate groups per 100 grams of said sulfonated Butyl rubber; and
(b) about 8 to about 30 parts of a zinc stearate per 100 grams of said sulfonated Butyl rubber.

* * * * *